(12) United States Patent
Shin

(10) Patent No.: US 8,127,196 B2
(45) Date of Patent: Feb. 28, 2012

(54) SERVER AND CLIENT FOR DETERMINING ERROR RESTORATION ACCORDING TO IMAGE DATA TRANSMISSION, AND METHOD OF DETERMINING ERROR RESTORATION ACCORDING TO IMAGE DATA TRANSMISSION

(75) Inventor: Seung-woo Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1074 days.

(21) Appl. No.: 11/941,198

(22) Filed: Nov. 16, 2007

(65) Prior Publication Data
US 2008/0215949 A1 Sep. 4, 2008

(30) Foreign Application Priority Data
Mar. 2, 2007 (KR) .................. 10-2007-0021146

(51) Int. Cl.
*H03M 13/00* (2006.01)
(52) U.S. Cl. .................. 714/751; 714/748; 714/776
(58) Field of Classification Search .................. 714/751, 714/776, 748, 774
See application file for complete search history.

(56) References Cited

U.S. PATENT DOCUMENTS

| 6,977,888 | B1 | 12/2005 | Frenger et al. |
| 7,539,925 | B2* | 5/2009 | Yamane .................. 714/774 |
| 2002/0054578 | A1* | 5/2002 | Zhang et al. .................. 370/328 |
| 2003/0126238 | A1 | 7/2003 | Kohno et al. |
| 2005/0050424 | A1* | 3/2005 | Matsuura .................. 714/748 |
| 2005/0160346 | A1* | 7/2005 | Yamane .................. 714/776 |
| 2008/0062982 | A1* | 3/2008 | Fujita et al. .................. 370/389 |

FOREIGN PATENT DOCUMENTS
KR 2006-100081 9/2006
* cited by examiner

*Primary Examiner* — Fritz Alphonse
(74) *Attorney, Agent, or Firm* — Staas & Halsey LLP

(57) ABSTRACT

Provided are a server and client for determining error restoration according to image data transmission, and a method thereof. The server includes a forward error correction (FEC) mode performer to output image data in which a redundant bit for error correction is added, an automatic repeat request (ARQ) mode performer to outputs the image data after receiving a response signal according to a data reception from a client that receives the image data, a mode determiner to determine whether to operate in an FEC mode or an ARQ mode so that error restoration is performed on the image data according to a reception buffering capacity of the client in regard to image data, and an interface to transmit image data outputted from the FEC mode performer or the ARQ mode performer to the client.

19 Claims, 2 Drawing Sheets

SERVER AND CLIENT FOR DETERMINING ERROR RESTORATION ACCORDING TO IMAGE DATA TRANSMISSION, AND METHOD OF DETERMINING ERROR RESTORATION ACCORDING TO IMAGE DATA TRANSMISSION

CROSS-REFERENCE TO RELATED APPLICATION

This application claims the benefit of Korean Patent Application No. 2007-21146, filed in the Korean Intellectual Property Office on Mar. 2, 2007, the disclosure of which is incorporated herein by reference.

BACKGROUND OF THE INVENTION

1. Field of the Invention

Aspects of the present invention relate to an apparatus and method of selecting an automatic repeat request (ARQ) mode or a forward error correction (FEC) mode according to a status of a buffer of a receiver.

2. Description of the Related Art

Two methods are used in order to guarantee reliability of data transmission: an automatic repeat request (ARQ) method and a forward error correction (FEC) method. In the ARQ method, a client transmits an acknowledgement (ACK) message to a server, which acknowledges that data transmitted from the server has been received. The server does not re-transmit data packets about which the ACK message is received. The server does re-transmit data packets to the client if the ACK message is not received, without waiting for a re-transmission request. By re-transmitting the data packets about which the ACK messages are not received, the client receives all of the data packets. The ARQ method is used when data is transmitted according to a transmission control protocol (TCP).

In the FEC method, the client does not transmit an ACK message. The client does not transmit information to the server about whether data is received. In order to correct a transmission error that can occur while transmitting the data, before transmitting the data the server adds to the data predetermined redundancy data for error correction. In order to guarantee reliability of data transmission without any separate feedback (such as the ACK message), an error correction method is provided while transmitting the data. The FEC method is used when the data is transmitted according to a user datagram protocol (UDP).

As wireless networks, such as Wibro/Wireless LANs, etc., develop, use of portable consumer devices increases. However, in transmission of video data in a wireless network, channel conditions, packet erasure, a multicast, and a broadcast are negatively affected by several constraints, including limits on data re-transmission. Accordingly, the FEC method is widely used as a streaming service error correction method in conventional mobile terminals. In streaming, the FEC method can effectively perform error correction, but the load on a network increases due to the large amount of redundancy data needed for the error correction. The FEC method transmits unnecessary redundancy data, which may cause an overload in the network. An increase in unnecessary redundancy data in a wireless network having a limited bandwidth can cause a heavy load on the network.

The ARQ method can guarantee reliability of data transmission. However, the server needs to re-transmit a data packet according to feedback received from the client, and thus the ARQ method is not suitable for one-to-multiple data communication, such as multicasting. When a real-time service, such as a streaming service, is provided via multicasting, data may be useless even when data is re-transmitted, due to the passage of time.

A method combining the ARQ method with the FEC method is also used. An example is data communication using the real-time transport protocol (RTP). The server multicasts data to a plurality of clients. Upon receiving the data, the clients determine whether some data packets are not received based on information included in a header of an RTP packet, such as a sequence number and a timestamp. If some of the data packets are not received, a real-time transport control protocol (RTCP) packet or a real-time streaming protocol (RTSP) packet, including information about packet loss and jitter, is transmitted to the server. The RTCP packet or the RTSP packet may be periodically transmitted or immediately transmitted as soon as packet loss occurs.

The ARQ method is introduced due to the fact that the server has information about reception environments, which was received from the clients, but data re-transmission is not performed. Accordingly, the FEC method can be used by the server transmitting the data after adding redundancy data to the data. When the server receives the RTCP packet or the RTSP packet, the server regulates Quality of Service (QoS) of the data transmission based on the information about reception environments, such as information on packet loss, jitter, etc., included in the received packet, and then transmits the data. The QoS of the data transmission is regulated by regulating the size of the redundancy data added according to the reception environments.

Quality of a streaming service depends on the status of the network. Accordingly, the quality of an image is maintained using an error correction method, such as the FEC method. When the status of the network is good, frequency of error occurrence is low. However, when the frequency of error occurrence is low, the redundancy data in the FEC method is a massive amount of unnecessary data in the network. When a streaming service, such as for an IP mobile TV, is provided in a wireless network, such dummy data not only deteriorates the QoS but also causes inefficient use of the network. Accordingly, the method in which the ARQ method and the FEC method are combined is used as described above, and the FEC method and the ARQ method are selectively used according to the status of network transmission. Consequently, an error correction method according to the data processing capacity of the client is not applied.

SUMMARY OF THE INVENTION

Aspects of the present invention provide a server and client for determining error restoration according to image data transmission, which can reduce unnecessary redundancy data in a wireless network having a limited bandwidth, increase the rate of error restoration, and enable a smooth streaming service, by suggesting a method of selecting an FEC method or an ARQ method based on a buffering status of a client, and a method thereof.

According to an aspect of the present invention, a server to determine error restoration according to image data transmission is provided. The server includes a forward error correction (FEC) mode performer to output image data in which at least one redundant bit for error correction is added; an automatic repeat request (ARQ) mode performer to output the image data after receiving a response signal according to data reception from a client that receives the image data; a mode determiner to determine whether to operate in an FEC mode or an ARQ mode so that error restoration is performed on the image data based on a reception buffering capacity of the client in regard to the image data; and an interface to transmit image data outputted from the FEC mode performer or the ARQ mode performer to the client.

According to another aspect of the present invention, a client to determine error restoration according to image data transmission is provided. The client includes a buffering capacity collector to collect information about a reception buffering capacity of image data; and an interface to transmit the collected information about the reception buffering capacity to a server and to receive the image data from the server.

According to another aspect of the present invention, a method of determining error restoration according to image data transmission is provided. The method includes determining whether to operate in an FEC mode or an ARQ mode according to a reception buffering capacity of a client receiving the image data, wherein the FEC mode adds at least one redundant bit for error correction to image data and outputs the image data in which the redundant bit is added, and the ARQ mode outputs the image data based on a response signal according to data reception received from the client; performing error restoration in the FEC mode or the ARQ mode on the image data according to the determined mode; and transmitting image data to the client outputted according to the FEC mode or the ARQ mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
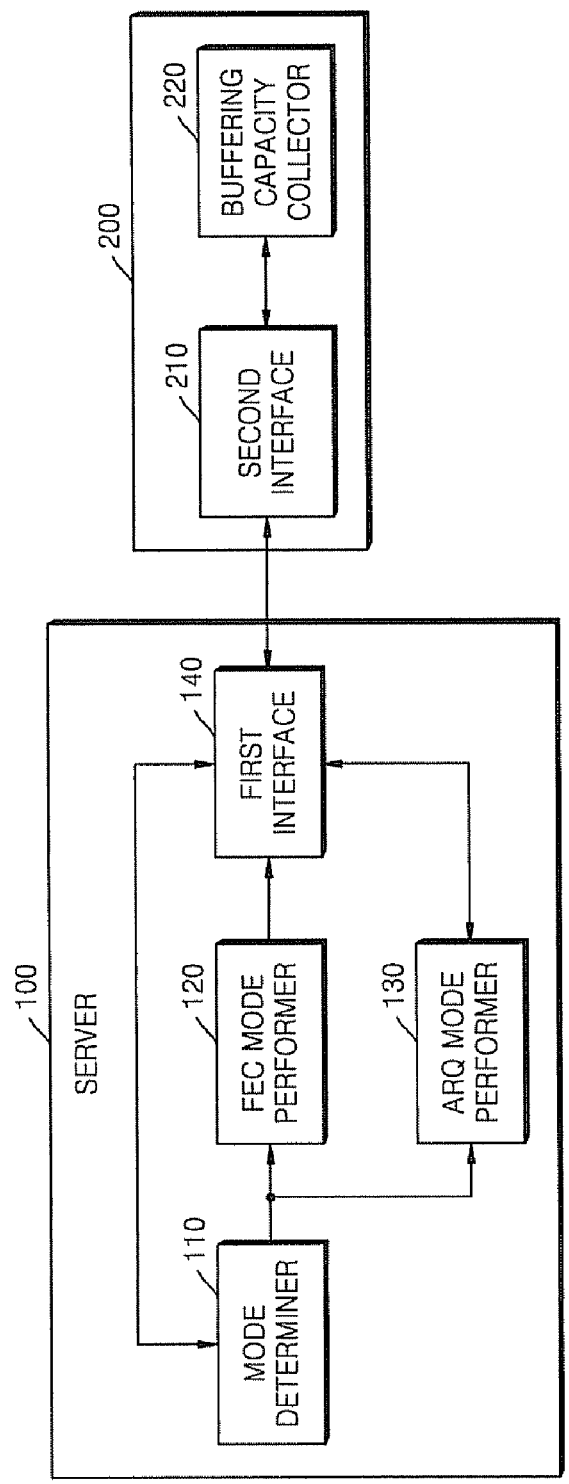
FIG. 1 is a block diagram describing a server and client for determining error restoration according to image data transmission according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram describing a server 100 and a client 200 for determining error restoration based on image data transmission according to an embodiment of the present invention. The client 200 transmits information about a reception buffering capacity to the server 100. The client 200 includes a second interface 210 and a buffering capacity collector 220. According to other aspects of the invention, the client may include additional components; similarly, the functionality of the above components may be integrated into a single unit. As used herein, image data includes video data, audio data, and audio/video data.

The buffering capacity collector 220 of the client 200 collects information about the reception buffering capacity of image data and outputs the result to the second interface 210. The reception buffering capacity is a temporary storage capacity that shows how much memory capacity is required to temporarily store image data for a streaming service. The buffering capacity collector 220 periodically collects the information about the reception buffering capacity.

The second interface 210 transmits the information about the reception buffering capacity collected in the buffering capacity collector 220 to the server 100. The second interface 210 may transmit the information about the reception buffering capacity to the server 100 using one of a real-time transport control protocol (RTCP) and a real-time streaming protocol (RTSP). The term "one of" a group of items is used herein in an alternative sense, i.e., the information may be transmitted using RTCP or RTSP. The second interface 210 also receives data transmitted from the server 100.

Upon receiving the information about the reception buffering capacity of image data from the client 200, the server 100 performs error restoration on the image data in one of a forward error correction (FEC) mode and an automatic repeat request (ARQ) mode, based on the reception buffering capacity. The server 100, as an apparatus for transmitting image data to the client 200, includes a mode determiner 110, an FEC mode performer 120, an ART mode performer 130, and a first interface 140.

The mode determiner 110 determines whether error restoration is to be performed in the FEC mode or the ARQ mode so that error restoration is performed on the image data based on the image data reception buffering capacity of the client 200, and transmits the result of the determination to the FEC mode performer 120 or the ARQ mode performer 130. The reception buffering capacity of the client 200 denotes a temporary storage capacity that shows how much memory capacity can be used to temporarily store image data for a streaming service. The mode determiner 110 receives the information about the reception buffering capacity from the client 200 via the first interface 140.

The mode determiner 110 periodically receives the information about the reception buffering capacity. The mode determiner 110 receives the information about the reception buffering capacity using RTCP, RTSP, or a similar protocol. The RTCP is a protocol for controlling a real-time transport protocol (RTP), which is a protocol for streaming image data or voice data via the Internet. RTSP is a communications protocol for transmitting/receiving voice data or animation data in real-time, and thus operates at an application layer, unlike the RTP. A packet transmitted by the RTCP or the RTSP may include information about communication environments, such as packet loss, jitter, electric field intensity, etc.

When the reception buffering capacity is greater than or equal to a predetermined rate, the mode determiner 110 determines the ARQ mode to perform error restoration, and outputs the result of determination to the ARQ mode performer 130. When the reception buffering capacity is less than the predetermined rate, the mode determiner 110 determines that error restoration is to be performed in the FEC mode, and outputs the result of determination to the FEC mode performer 120. The predetermined rate corresponds to a threshold rate used to determine whether a buffering status is good.

For example, if the buffering status is good when the maximum reception buffering capacity is 80%, the mode determiner 110 determines that error restoration to be performed in the ARQ mode when the reception buffering capacity is greater than or equal to 80%, and determines that error restoration to be performed in the FEC mode when the reception buffering capacity is less than 80%. When the reception buffering capacity of the client 200 is good, packet loss and frequency of error occurrence are low. In this case, an error may be corrected in the ARQ mode, since the time to reproduce image data currently being buffered is larger than the time required to re-transmit image data having an error by the ARQ mode.

However, when the reception buffering capacity of the client 200 is not good, error restoration should be performed in the FEC mode. This is because when an error is corrected in the ARQ mode, the network is overloaded due to frequent image data re-transmission, and the time to reproduce data currently being buffered is smaller than the time required to re-transmit image data having an error.

In response to the determination of the FEC mode by the mode determiner 110, the FEC performer 120 adds at least one redundancy bit for error correction to image data that is to be transmitted to the client 200, and outputs the image data having the redundancy bit to the first interface 140. The FEC mode performer 120 changes the size of the redundancy bit according to a communication status for transmitting the image data and the frequency of error occurrence before adding the redundancy bit to the image data. Changing the size of the redundancy bit according to the communication status corresponds to conventional technology, and thus a detailed description thereof will be omitted herein.

As described above, the FEC mode performer 120 operates in order to correct an error when the reception buffering capacity of the client 200 is not good. The FEC mode performer 120 does not re-transmit image data having an error. Instead, the FEC mode performer 120 pre-adds the redundancy bit for error correction to the image data before outputting the image data to the client 200.

In response to the determination of the ARQ mode by the mode determiner 110, the ARQ mode performer 130 receives a response signal based on data received from the client 200, and outputs the image data to the first interface 140. For example, when a response signal ACK, showing that there is no error in image data, is received via the first interface 140 while transmitting the image data to the client 200, the ARQ mode performer 130 does not re-transmit the same image data. However, when a response signal NAK, showing that there is an error in image data, is received via the first interface 140 while transmitting the image data to the client 200, the ARQ mode performer 130 re-outputs the same image data to the first interface 140.

The first interface 140 receives the information about the reception buffering capacity provided from the client 200 and outputs the information about the reception buffering capacity to the mode determiner 110. In the ARQ mode, the interface 140 receives the response signal ACK or NAK from the client 200 and outputs the received response signal ACK or NAK to the ARQ mode performer 130. The first interface 140 transmits image data outputted by the FEC mode performer 120 or the ARQ mode performer 130 to the client 200. The second interface 210 of the client 200 receives the image data from the server 100. The client 200 decodes and reproduces the image data transmitted from the server 100.

Figure 2:
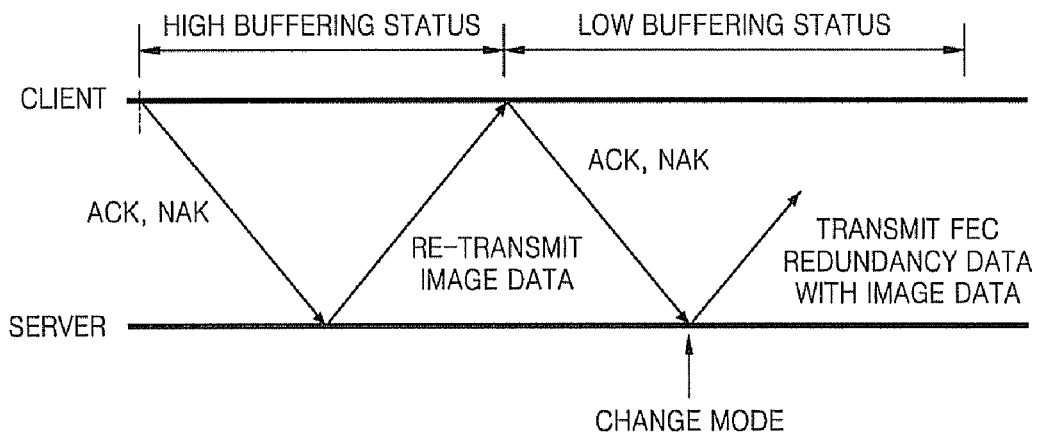
FIG. 2 is a diagram of a data transmission between the server and the client illustrated in FIG. 1.

FIG. 2 is a diagram of data transmission between the server 100 and the client 200 illustrated in FIG. 1. As illustrated in FIG. 2, the server 100 operates in the ARQ mode when the reception buffering capacity is good in order to receive, from the client 200, the response signal ACK or NAK about the existence of an error in the image data transmission, and to re-transmit image data without any error in response to the received response signal ACK or NAK. However, when the reception buffering capacity is not good, the server 100 operates in the FEC mode so as to add the redundancy bit for error correction to the image data before transmitting the image data.

Figure 3:
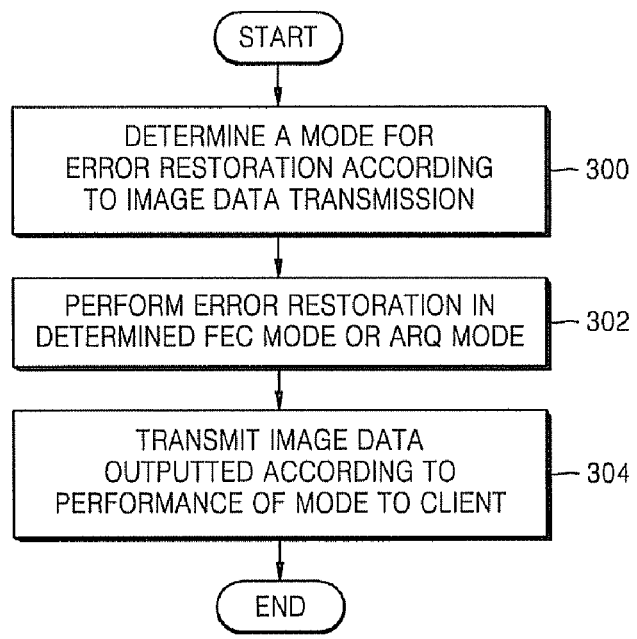
FIG. 3 is a flowchart of a technique of determining error restoration according to image data transmission according to an embodiment of the present invention.

A technique of determining error restoration according to image data transmission will be described with reference to FIG. 3. FIG. 3 is a flowchart illustrating a technique of determining error restoration according to image data transmission according to an embodiment of the present invention. First, a mode is determined out of the FEC mode and the ARQ mode in order to perform error restoration according to a reception buffering capacity of a client in regard to image data. The client receives the image data in operation 300.

Information about the reception buffering capacity is periodically provided by the client. The information about the reception buffering capacity is provided using RTCP, RTSP, or a similar protocol. When the reception buffering capacity is greater than or equal to a predetermined rate, error restoration is performed in the ARQ mode. When the reception buffering capacity is less than the predetermined rate, error restoration is performed in the FEC mode.

The predetermined rate corresponds to a threshold rate used to determine whether the reception buffering status is good. When the reception buffering capacity of the client is good, packet loss and frequency of error occurrence are low. In this case, errors may be corrected in the ARQ mode, since the time to reproduce data currently being buffered is large compared to the time required to re-transmit image data having an error. When the reception buffering capacity of the client is not good, error restoration may be performed in the FEC mode.

The FEC mode or the ARQ mode is performed on the image data according to the determined mode in operation 302. The FEC mode and the ARQ mode described are merely exemplary modes; additional or different modes may be performed as well, depending on the reception buffering capacity of the client. In the FEC mode, at least one redundancy bit for error correction is added to image data that is to be transmitted to the client and the image data with the redundancy bit is outputted. The size of the redundancy bit is changed according to the communication status for image data transmission and the frequency of error occurrence before adding the redundancy bit to the image data. The FEC mode is used to correct an error when the reception buffering capacity of the client is not good.

In the ARQ mode, the image data is re-outputted by receiving a response signal according to received data from the client that is receiving the image data. For example, when a response signal showing that there is no error in receiving the image data is received from the client, the same image data is not re-transmitted. However, when a response signal showing that there is an error in receiving the image data is received from the client, the same image data is re-transmitted.

Image data outputted according to the performance of the FEC mode or the ARQ mode is transmitted to the client in operation 304. The client decodes and reproduces the received image data.

The technique of determining an error restoration according to image data transmission according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The server and client for determining error restoration according to image data transmission and the method thereof according to aspects of the present invention can reduce unnecessary redundancy data in a wireless network having a limited bandwidth, increase the rate of error restoration, increase the reproduction quality of an image while reducing the load on the network for an efficient IPTV service, and enable an efficient streaming service using a mobile terminal, by suggesting a method of selecting one of the FEC mode and the ARQ mode based on the reception buffering status of the client.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A server to determine error restoration according to image data transmission, the server comprising:
   a forward error correction (FEC) mode performer to output image data in which at least one redundant bit for error correction is added;
   an automatic repeat request (ARQ) mode performer to output the image data after receiving a response signal according to data reception from a client that receives the image data;
   a mode determiner to determine whether to operate in an FEC mode or an ARQ mode so that error restoration is performed on the image data based on a reception buffering capacity of the client in regard to the image data; and
   an interface to transmit image data outputted from the FEC mode performer or the ARQ mode performer to the client,
   wherein the mode determiner determines to perform the error restoration using the ARQ mode when the reception buffering capacity is greater than or equal to a predetermined value and determines to perform the error restoration using the FEC mode when the reception buffering capacity is less than the predetermined value.

2. The server of claim 1, wherein the mode determiner receives information about the reception buffering capacity from the client.

3. The server of claim 2, wherein the mode determiner periodically receives the information about the reception buffering capacity.

4. The server of claim 1, wherein the predetermined value corresponds to a threshold rate used to determine whether a buffering status is good.

5. A server to determine error restoration according to image data transmission, the server comprising:
   a forward error correction (FEC) mode performer to output image data in which at least one redundant bit for error correction is added;
   an automatic repeat request (ARQ) mode performer to output the image data after receiving a response signal according to data reception from a client that receives the image data;
   a mode determiner to determine whether to operate in an FEC mode or an ARQ mode so that error restoration is performed on the image data based on a reception buffering capacity of the client in regard to the image data; and
   an interface to transmit image data outputted from the FEC mode performer or the ARQ mode performer to the client,
   wherein the mode determiner receives information about the reception buffering capacity from the client using one of a real-time transport control protocol (RTCP) and a real-time streaming protocol (RTSP).

6. A server to determine error restoration according to image data transmission, the server comprising:
   a forward error correction (FEC) mode performer to output image data in which at least one redundant bit for error correction is added;
   an automatic repeat request (ARQ) mode performer to output the image data after receiving a response signal according to data reception from a client that receives the image data;
   a mode determiner to determine whether to operate in an FEC mode or an ARQ mode so that error restoration is performed on the image data based on a reception buffering capacity of the client in regard to the image data; and
   an interface to transmit image data outputted from the FEC mode performer or the ARQ mode performer to the client,
   wherein the FEC mode performer changes the size of the redundant bit according to a communication status for the image data transmission and the frequency of error occurrence, and adds the redundant bit having the changed size to the image data.

7. A client to determine error restoration according to image data transmission, the client comprising:
   a buffering capacity collector to collect information about a reception buffering capacity of image data; and
   a first interface to transmit the collected information about the reception buffering capacity to a server and to receive the image data from the server,
   wherein the first interface receives image data outputted from a forward error correction (FEC) mode performer or a automatic repeat request (ARQ) mode performer via a second interface of the server, and
   wherein the server determines, using the collected information about the reception buffering capacity received from the client, to perform error restoration using the ARQ mode when the reception buffering capacity is greater than or equal to a predetermined value, and to perform error restoration using the FEC mode when the reception buffering capacity is less than the predetermined value.

8. The client of claim 7, wherein the buffering capacity collector periodically collects the information about the reception buffering capacity.

9. The client of claim 7, wherein the first interface transmits the information about the reception buffering capacity to the server using one of a real-time transport control protocol (RTCP) and a real-time streaming protocol (RTSP).

10. A method of determining error restoration according to image data transmission, the method comprising:
   determining, using a computer, whether to operate in an FEC (forward error correction) mode or an ARQ (automatic repeat request) mode according to a reception buffering capacity of a client receiving the image data, wherein the FEC mode adds at least one redundant bit for error correction to image data and outputs the image data in which the redundant bit is added, and the ARQ mode outputs the image data based on a response signal according to data reception received from the client;
   performing error restoration in the FEC mode or the ARQ mode on the image data according to the determined mode; and
   transmitting image data to the client outputted according to the FEC mode or the ARQ mode,
   wherein the determining of whether to operate in the FEC mode or the ARQ mode comprises determining that the error restoration is to be performed in the ARQ mode when the reception buffering capacity is greater than or equal to a predetermined value and determining that the error restoration is to be performed in the FEC mode when the reception buffering capacity is less than the predetermined value.

11. The method of claim 10, wherein the determining of whether to operate in the FEC mode or in the ARQ mode comprises receiving information about the reception buffering capacity from the client.

12. The method of claim 11, wherein the determining of whether to operate in the FEC mode or in the ARQ mode comprises periodically receiving information about the reception buffering capacity.

13. The method of claim 10, wherein the predetermined rate corresponds to a threshold rate determining that a buffering status is good.

14. A method of determining error restoration according to image data transmission, the method comprising:
   determining, using a computer, whether to operate in an FEC (forward error correction) mode or an ARQ (automatic repeat request) mode according to a reception buffering capacity of a client receiving the image data, wherein the FEC mode adds at least one redundant bit for error correction to image data and outputs the image data in which the redundant bit is added, and the ARQ mode outputs the image data based on a response signal according to data reception received from the client;
   performing error restoration in the FEC mode or the ARQ mode on the image data according to the determined mode; and
   transmitting image data to the client outputted according to the FEC mode or the ARQ mode,
   wherein the determining of whether to operate in the FEC mode or in the ARQ mode comprises receiving information about the reception buffering capacity from the client using one of a real-time transport control protocol (RTCP) and a real-time streaming protocol (RTSP).

15. A method of determining error restoration according to image data transmission, the method comprising:
   determining, using a computer, whether to operate in an FEC (forward error correction) mode or an ARQ (automatic repeat request) mode according to a reception buffering capacity of a client receiving the image data, wherein the FEC mode adds at least one redundant bit for error correction to image data and outputs the image data in which the redundant bit is added, and the ARQ mode outputs the image data based on a response signal according to data reception received from the client;
   performing error restoration in the FEC mode or the ARQ mode on the image data according to the determined mode; and
   transmitting image data to the client outputted according to the FEC mode or the ARQ mode,
   wherein in the performing in the FEC mode, the size of the redundant bit changes according to a communication status of the image data transmission and frequency of error occurrence, and the redundant bit is added to the image data.

16. A non-transitory computer readable recording medium having recorded thereon a program to execute a method of determining error restoration according to image data transmission, the method comprising:
   determining whether to operate in an FEC (forward error correction) mode or in an ARQ (automatic repeat request) mode according to a reception buffering capacity of a client receiving the image data, wherein the FEC mode adds at least one redundant bit for an error correction to image data and outputs the image data in which the redundant bit is added, and the ARQ mode outputs the image data based on a response signal according to data reception received from the client;
   performing error restoration on the image data in the FEC mode or the ARQ mode according to the determined mode; and
   transmitting image data to the client outputted according to the FEC mode or the ARQ mode,
   wherein the determining of whether to operate in the FEC mode or the ARQ mode comprises determining that the error restoration is to be performed in the ARQ mode when the reception buffering capacity is greater than or equal to a predetermined value and determining that the error restoration is to be performed in the FEC mode when the reception buffering capacity is less than the predetermined value.

17. A system to guarantee reliability of data transmission comprising:
   a server to transmit image data to at least one client in one of an FEC (forward error correction) mode and an ARQ (automatic repeat request) mode, the mode determined based on reception buffering capacity of one of the clients, wherein the FEC mode adds at least one redundant bit for error correction to the image data to be transmitted and the ARQ mode outputs the image data based on a response signal from the one of the clients; and
   a client to receive the image data from the server and to transmit the reception buffering capacity of the client to the server,
   wherein the server comprises:
   an interface unit to receive data from the client and to transmit data to the client;
   a mode determining unit to determine whether to operate the server in the FEC mode or in the ARQ mode, depending on the reception buffering capacity received from the client;
   an FEC mode performer to perform forward error correction coding on the image data by adding at least one redundant bit to the image data and to transmit the error-corrected image data to the client via the interface unit, when the mode determining unit determines to operate the server in the FEC mode; and
   an ARQ mode performer to transmit the image data to the client via the interface unit based on a response signal received from the client, when the mode determining unit determines to operate the server in the ARQ mode.

18. The system of claim 17, wherein the client comprises:
an interface to receive data from the server and to transmit data to the server; and
a buffering capacity collector to collect information about the reception buffering capacity of the client and to transmit the collected reception buffering capacity information to the server via the interface.

19. A system to guarantee reliability of data transmission comprising:
a server to transmit image data to at least one client in one of an FEC (forward error correction) mode and an ARQ (automatic repeat request) mode, the mode determined based on reception buffering capacity of one of the clients, wherein the FEC mode adds at least one redundant bit for error correction to the image data to be transmitted and the ARQ mode outputs the image data based on a response signal from the one of the clients; and
a client to receive the image data from the server and to transmit the reception buffering capacity of the client to the server,
wherein the server comprises:
a mode determining unit to determine whether to operate the server in the FEC mode or in the ARQ mode,
wherein the mode determining unit determines to operate the server in the ARQ mode if the reception buffering capacity of the client is greater than or equal to a predetermined value and determines to operate the server in the FEC mode if the buffering capacity of the client is less than the predetermined value.

* * * * *